United States Patent [19]

Upadhyay

[11] Patent Number: 4,633,381

[45] Date of Patent: Dec. 30, 1986

[54] INVERTER SHOOT-THROUGH PROTECTION CIRCUIT

[75] Inventor: Anand Upadhyay, Rockford, Ill.

[73] Assignee: Sundstrand Corporation, Rockford, Ill.

[21] Appl. No.: 705,663

[22] Filed: Feb. 26, 1985

[51] Int. Cl.[4] .............. H02H 7/122

[52] U.S. Cl. .............. 363/56; 363/98; 363/132

[58] Field of Search .............. 363/41, 50, 55, 56, 363/57, 98, 132

[56] References Cited

U.S. PATENT DOCUMENTS

| | | | |
|---|---|---|---|
| 3,828,208 | 8/1974 | Kelleher | 307/270 |
| 3,852,656 | 12/1974 | Bourbeau | 363/58 |
| 4,095,128 | 6/1978 | Tanigaki | 363/56 X |
| 4,126,819 | 11/1978 | Stobbe et al. | 363/132 X |
| 4,150,424 | 4/1979 | Nuechterlein | 363/56 X |
| 4,155,113 | 5/1979 | Simmons | 363/56 |
| 4,342,076 | 7/1982 | Rosswurm et al. | 363/56 |
| 4,371,824 | 2/1983 | Gritter | 363/56 X |
| 4,456,949 | 6/1984 | Incledon | 363/56 X |

*Primary Examiner*—Peter S. Wong
*Assistant Examiner*—Emanuel Todd Voeltz
*Attorney, Agent, or Firm*—Wood, Dalton, Phillips, Mason & Rowe

[57] ABSTRACT

Prior circuits for protecting inverter switches from the possibility of overlapping operation which may cause shoot-through have required complex and expensive delay circuits to provide a fixed delay between turn-off of one switch and turn-on of the complementary switch. In order to overcome the problem of complexity and expense, a protection circuit according to the present invention includes a drive signal source for developing complementary first and second drive signals and first and second drive logic circuits coupled to the drive signal source for controlling first and second switching devices, respectively, in response to the drive signals so that overlapping operation is prevented. Each of the drive logic circuit includes an inhibit logic circuit having first and second inputs which receive the drive signal and an inhibit signal developed by the other drive logic circuit, respectively. The inhibit logic circuit generates a control signal to turn on the respective switching device only when the drive signal is present and the inhibit signal from the other drive logic circuit is not present. Circuits are included for generating the inhibit signal that is coupled to the inhibit logic of the other drive logic circuit, such inhibit signal being generated during the time that the control signal is generated and for a predetermined time period thereafter so that the complementary switch is maintained in an off state until the predetermiend time period has elapsed.

17 Claims, 4 Drawing Figures

INVERTER SHOOT-THROUGH PROTECTION CIRCUIT

TECHNICAL FIELD

The present invention relates generally to protection circuitry for power switches and more particularly to a circuit for preventing simultaneous conduction of series-connected power switches in a leg or branch of an inverter.

BACKGROUND ART

Transistorized power inverters typically include one or more inverter legs or branches coupled to a DC power source. Each leg includes a pair of switches which are alternately operated to connect the junction therebetween to the voltages developed by the DC source to in turn produce an alternating phase output.

In such an inverter, it is important that one of the power switches be fully turned off before the other is turned on to prevent shorting of the DC power source. Such a condition, commonly called "shootthrough" or "cross conduction" can result in a degradation of the output waveform or even destruction of one or both of the transistors.

One prior attempt at minimizing the possibility of shoot-through in an inverter circuit is disclosed in Stobbe et al U.S. Pat. No. 4,126,819. This patent discloses the use of current sensors, such as resistors, coupled in series with the emitter electrode of each of a plurality of power transistors. The voltage across each current sensor is coupled through a driver circuit to the base of the complementary transistor in the inverter leg so that one transistor is maintained in an off condition while the other transistor is conducting current above a specified level.

Other patents disclosing circuits for maintaining one transistor in an inverter leg in an off condition until a specified condition is reached by a complementary transistor in the inverter leg are Gritter U.S. Pat. No. 4,371,824, Rosswurm et al U.S. Pat. No. 4,342,076, and Kelleher U.S. Pat. No. 3,828,208.

None of the above-noted patents discloses a simple and completely satisfactory circuit for preventing cross conduction or shoot-through. For example, the use of a resistor as a current sensor in the collector-emitter circuit of the Stobbe et al patent reduces the maximum switching frequency which can be attained and results in an undesirable power loss. Further, such current sensors undesirably affect the ability of a snubber circuit connected across the collector and emitter electrodes of each power transistor to dissipate transients caused by switching of the transistors.

A somewhat different approach to a solution of this problem is disclosed in Simmons U.S. Pat. No. 4,155,133. This patent discloses a circuit which prevents overlapping operation of transistors in an inverter by providing a fixed time delay between the base drive commands which are ultimately coupled to the inverter transistors. The Simmons circuit includes a pair of switching amplifiers that control the conduction of the series-connected power switches in each leg of the inverter in accordance with first and second driving pulses. The driving pulses are coupled to the inputs of the switching amplifiers through delay networks. The time constants of the delay networks are selected so that that there is a predetermined length of time between removal of base drive from one switch and application of base drive to the other switch, which duration is at least as great as the charge storage time of the transistors and less than half the duration of the drive pulses.

However, Simmons does not sense the outputs of the switching amplifiers to determine when the application of base drive to one of the transistors has been terminated, and hence there is no guarantee in the event of a malfunction that the base drive from one transistor has been removed before another transistor is driven into conduction.

Further, the Simmons system relies on complex delay circuits and is generally expensive to implement.

A still further circuit for preventing shootthrough in an inverter is disclosed in Glennon U.S. application Ser. No. 687,204, filed Dec. 28, 1984, entitled "Transistor Inverter Interlock Circuit" and assigned to the assignee of the instant application. This application discloses an interlock circuit which includes means for generating a gating signal when the voltage across two electrodes of one of a pair of series-connected power switches reaches a selected level indicative of turn-off of such switch and means for inhibiting turn-on of the complementary switch until the gating signal is generated.

DISCLOSURE OF THE INVENTION

In accordance with the present invention, an inverter shoot-through protection circuit for preventing simultaneous conduction of series-connected complementary power switches in an inverter leg or branch includes means for preventing turn-on of one of the switches until the control signal for operating the complementary switch has been discontinued for a predetermined length of time.

More particularly, the protection circuit of the instant invention includes means for developing complementary first and second drive signals and first and second means coupled to the drive signal developing means for controlling the first and second switching devices, respectively, in response to the complementary drive signals. Each of the controlling means includes an inhibit logic circuit having first and second inputs which receive the drive signal and an inhibit signal developed by the other controlling means, respectively. The inhibit logic circuit generates a control signal to turn on the respective switching device only when the drive signal is present and the inhibit signal from the other controlling means is not present. Means are also provided in each of the controlling means for generating the inhibit signal that is coupled to the inhibit logic of the other control means, such inhibit signal being generated during the time that the control signal is generated and for a predetermined time period thereafter.

The predetermined time period is selected to be at least as long as the anticipated turn-off time of the switches in the inverter so that the possibility of shootthrough is minimized.

The protection circuit of the present invention is effective to prevent shoot-through in a simple and effective manner, and does not require complex delay circuitry or sensors which interfere with the ability to dissipate switching transients.

BEST MODE FOR CARRYING OUT THE INVENTION

Figure 1:
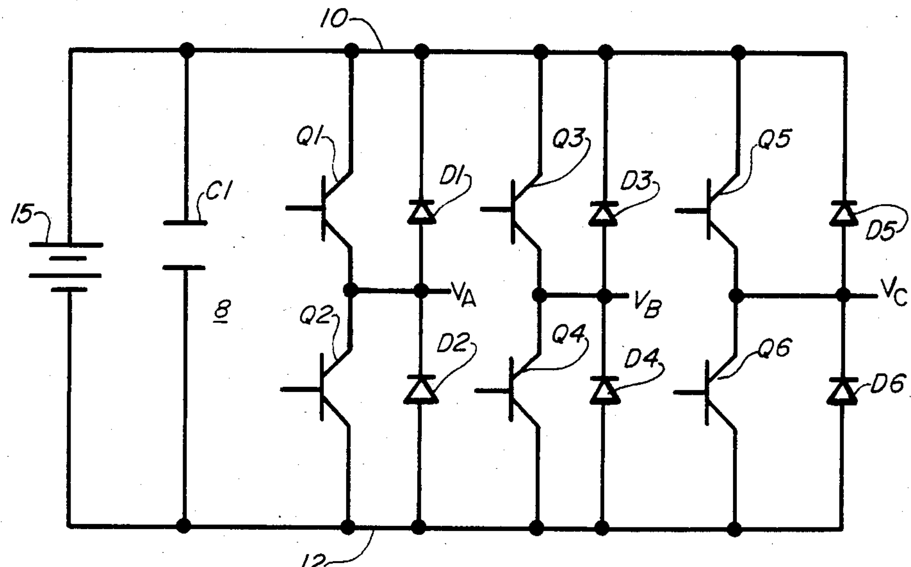
FIG. 1 is a simplified schematic diagram of an inverter output stage with which the shoot-through protection circuit of the present invention may be used.

Referring now to FIG. 1, a typical inverter output stage 8 includes six transistors Q1–Q6 connected in a three-phase bridge configuration across a pair of rails 10,12. The rails 10,12 are in turn coupled to a source of DC power 15. A capacitor C1 may be coupled across the rails 10,12 for filtering, as is conventional.

Connected across each of the collector and emitter electrodes of the transistors Q1–Q6 is a free-wheeling diode D1-D6, respectively. Also connected across each collector-emitter circuit is a snubber (not shown) for dissipating transients.

Figure 2:
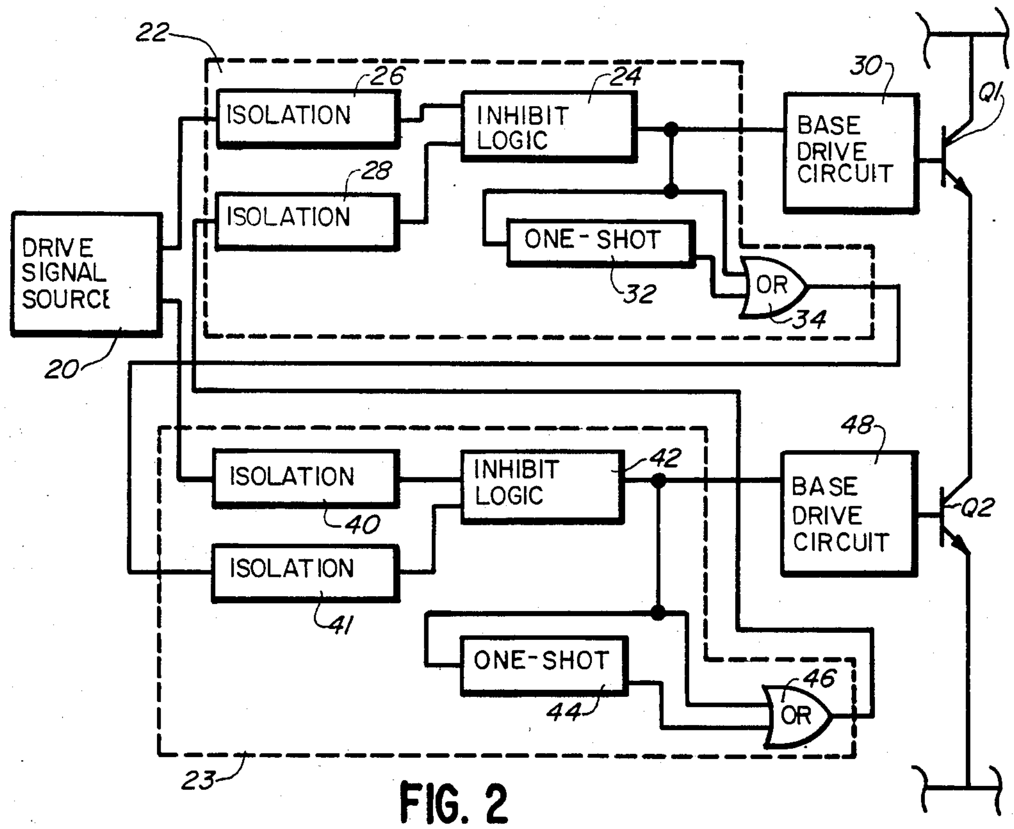
FIG. 2 is a simplified block diagram of the inverter shoot-through protection circuit of the present invention in conjunction with the switches Q1 and Q2 shown in FIG. 1.

While the switches shown in FIGS. 1 and 2 are illustrated as bipolar transistors, it should be noted that these switches may alternatively be gate turn-off devices, thyristors (with appropriate commutating circuitry) or any other similar switching device.

The switches in each leg of the inverter are alternately operated to connect the junction therebetween to either of the rails 10 or 12 to produce an alternating output voltage $V_A$,$V_B$,$V_C$. These voltages are in turn coupled to an AC load (not shown) to energize the same.

Referring now to FIG. 2, there is illustrated a block diagram of a protection circuit according to the present invention. The circuit is effective to prevent simultaneous conduction of both switches in each inverter leg or branch, such as the switches Q1 and Q2, to prevent destruction of the switches and/or degradation in the output of the inverter.

As seen in FIG. 2, the protection circuit includes means, in the form of a drive signal source 20, for developing complementary first and second drive signals and first and second means 22,23 for controlling the first and second switching devices Q1,Q2, respectively. The controlling means 22,23, also referred to as drive logic circuits, are identical and hence only the drive logic 22 will initially be described in detail.

The drive logic circuit 22 includes an inhibit logic circuit 24 having first and second inputs which receive one of the drive signals from the signal source 20 and an inhibit signal developed by the other drive logic circuit 23 via isolation circuits 26,28. The inhibit logic generates a control signal to turn on the respective switching device Q1 via a base drive circuit 30 only when the drive signal from the signal source 20 is present at the first input and the inhibit signal from the other drive logic is not present at the second input.

The drive logic 22 further includes means, in the form of a falling-edge monostable or one-shot 32 and an OR gate 34, for generating a further inhibit signal which is coupled through an isolation circuit 40 to an inhibit logic circuit 42 in the drive logic 23.

The drive logic 23 includes a monostable or one-shot 44, an OR gate 46 and a base drive circuit 48 analogous to the above-described circuits 32, 34 and 30, respectively, in the drive logic 22.

The operation of the circuitry shown in FIG. 2 will now be explained in conjunction with the waveforms illustrated in FIG. 3.

Figure 3:
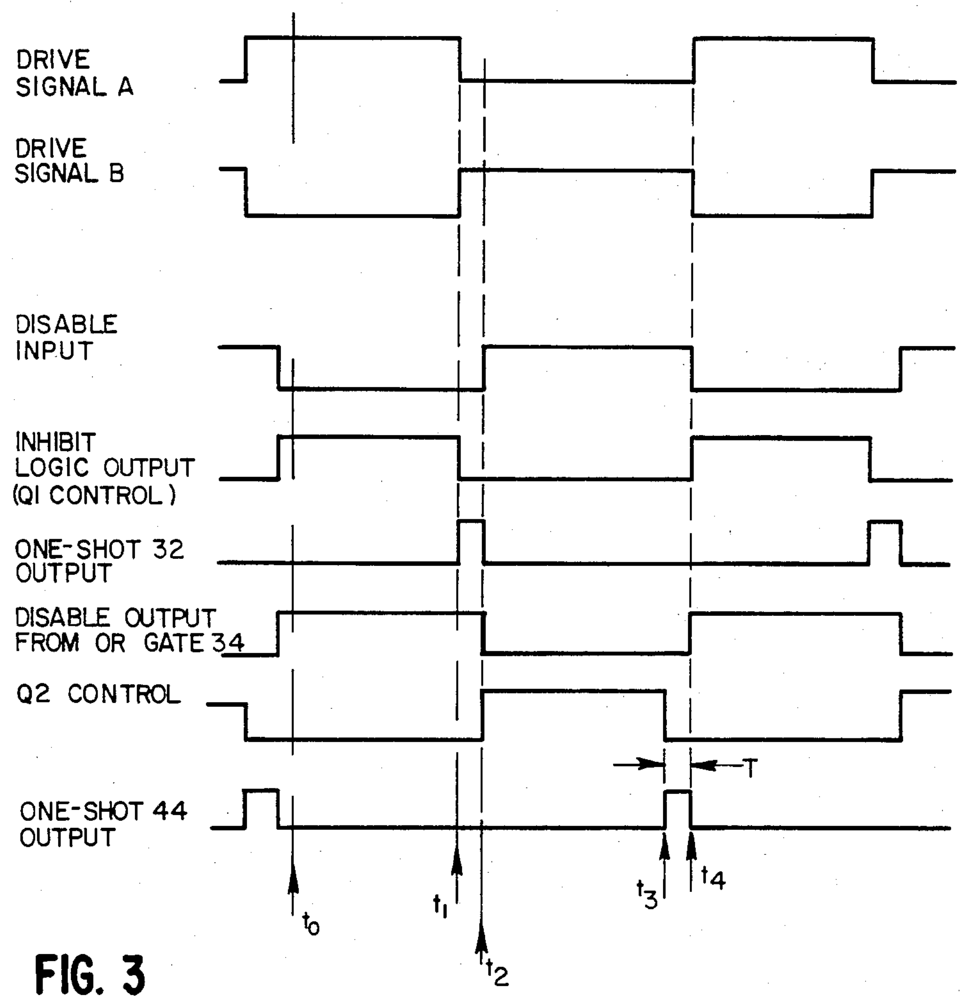
FIG. 3 is a set of waveform diagrams illustrating the operation of the circuit shown in FIG. 2.

As seen in FIG. 3, the drive signal source 20 develops complementary drive signals, denoted drive signal A and drive signal B, which are coupled to the first inputs of the drive logic circuits 22,23.

Assume that at time $t=t_0$, the drive signal A is present, i.e. in a high state, while the drive signal B is in the low state and that this condition has existed for longer than a time period T which is the duration of a pulse developed by the one-shot circuit 44 in the drive logic 23. At $t_0$, the first input to the drive logic 22 at the isolation circuit 26 is in a high state while the second input to the drive logic 22 at the isolation circuit 28 is in a low state. These signals are isolated by the circuits 26,28 and are provided to the two inputs of the inhibit logic circuit 24.

Figure 4:
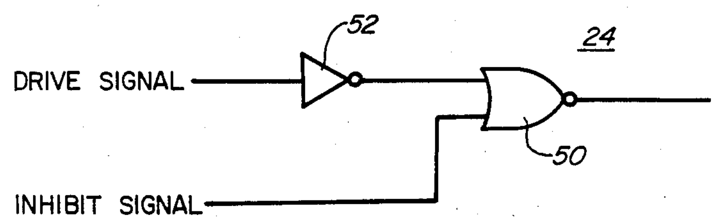
FIG. 4 is a schematic diagram of a preferred embodiment of the inhibit logic 24 or 42 shown in FIG. 2.

As seen specifically in FIG. 4, the inhibit logic circuit 24 comprises a NOR gate 50 having first and second inputs. The first input is coupled via an inverter 52 to the output of the isolation circuit 26. A second input of the NOR gate 50 is coupled to the output of the isolation circuit 28.

The output of the NOR gate 50 is in a high state only when a drive signal is developed by the drive signal source 20 and the inhibit signal coupled to the second input of the drive logic 22 is in a low state. As seen in FIG. 3, this is the case at time $t=t_0$ and hence the inhibit logic circuit 24 generates a control signal which is coupled to the base drive circuit 30 to turn on or operate the switch Q1.

Moreover, the high state control signal from the inhibit logic circuit 24 is coupled to the first input of the OR gate 34, which in response thereto generates an inhibit signal that is coupled to the second input of the drive logic 23. This inhibit signal causes the output of the inhibit logic circuit 42 to be in a low state, in turn ensuring that the transistor Q2 is maintained off.

At time $t=t_1$, the drive signals A and B change state, i.e. the drive signal A assumes a low state while the drive signal B assumes a high state. When this occurs, the output of the inhibit logic circuit 24 immediately drops to a low state causing the one-shot 32 to develop a pulse of predetermined duration T which is coupled to the second input of the OR gate 34. The output of the OR gate 34 therefore remains in a high state to maintain the switch Q2 in an off condition during the interval T.

In practice, there will be an extremely short delay between fall of the output of the inhibit logic circuit 24 to the low state and development of the pulse at the output of the one-shot 32, such delay being on the order of nanoseconds. In order to prevent such delay from causing undesired operation of the complementary transistor Q2, it may be necessary to interpose a delay circuit between the output of the circuit 24 and the first input of the OR gate 34 so that the output of the gate 34 remains in a high state during this time.

At time $t=t_2$, following the duration T the output of the one-shot 32 returns to the low state. Since the first input to the OR gate 34 is also in a low state, the inhibit signal developed thereby drops to a low state, in turn removing the high state signal from the second input of the inhibit logic circuit 42. During this time, the first input of the inhibit logic circuit 42 is receiving a high state drive signal from the signal source 20 and the isolation circuit 40. This combination of inputs causes the logic circuit 42 to develop a high state control signal. This control signal is coupled by the base drive circuit 48 to the switch Q2 to operate same. Furthermore, the control signal is coupled by the OR gate 46 to the second or disable input of the drive logic 22 to maintain the transistor Q1 off.

At time $t=t_3$, the drive signals A and B again change state. The transistor Q2 is then turned off by the inhibit logic circuit 42 and the one-shot 44 develops a pulse of predetermined duration T, which pulse is coupled by the OR gate 46 to the drive logic 22 to maintain the transistor Q1 in the off state.

Again, it may be necessary to use a simple delay circuit at the first input to the OR gate 46 to take into account the short propagation delay of the one-shot 44.

At time $t=t_4$, the output of the one-shot 44 drops to a low state, in turn causing the inhibit logic circuit 24 to turn the transistor Q1 on again, thereby repeating the above-described sequence of events.

The duration of the pulses developed by the one-shots 32,44 is selected to be longer than the anticipated turn-off time of the switches. Since each switch is maintained in an off state until a predetermined time T following the removal of base drive to the complementary switch, it follows that the chances of shoot-through are minimized. This result is effected in a simple and inexpensive manner by the present invention.

It should be noted at this point that the duration of the pulses produced by the one-shots 32,44 may be equal, such as is illustrated in FIG. 3, or may be unequal, if desired.

The above-described sequence of events are illustrated for the case when the switches are to be operated in a "full on" mode, i.e. no pulse width modulation. In the event that a pulse width modulation strategy is to be used to control the switches in the inverter, a situation might arise where the pulse width of the control or base drive to a switch is on the order of the duration T of the pulses developed by the one-shots 32,44. In this case, the switch will either be operated for a period of time equal to the pulse width reduced by the duration T or will not be operated at all if the pulse width is less than the duration T.

For example, the protection circuit of the instant invention may be advantageously utilized in an inverter control such is that described in Glennon U.S. application Ser. No. 534,170, filed Sept. 19, 1983, entitled "Method and Apparatus for Controlling Switches in an Inverter" and assigned to the assignee of the instant application. The inverter control described in that patent application operates an inverter such as that described in FIG. 1 herein in a voltage source mode of operation wherein each phase output is always connected to one or the other of the rails 10,12. Briefly, the control generates a PWM signal which is used to control the conduction of the switches in the inverter. When the PWM signal is in a high state, two of the phase outputs are coupled to one rail while the remaining phase output (also referred to as the "lone phase" output) is coupled to the opposite rail. When the PWM wave switches to a low state, the switches associated with the phase output which is coupled to the opposite rail both switch states so that the remaining phase output is coupled to the same rail as the other two phases.

When the instant protection circuit is utilized in conjunction with the above-described control, the inverter operation is modified so that it no longer operates in a true voltage source mode of operation. More particularly, the PWM signal typically remains in the low state for only a brief period of time on the order of the duration T of the pulses developed by the one-shots 32,34 of the instant invention. Should the duration T be longer than the period of time the PWM signal is in the low state, then during this time the switch associated with the lone phase which was closed will be opened, while the other switch remains open, so that the phase output assumes a voltage which is a function of the current through the phase output at the time of switching.

For example, assume that the PWM signal developed by the inverter control is in a high state and that the phase outputs $V_B$ and $V_C$ are coupled to the lower rail 12 by closed switches Q4 and Q6 while the remaining phase output $V_A$ is coupled by closed switch Q1 to the upper rail 10. During this time, the switches Q2, Q3 and Q5 are off. When the PWM signal switches to a low state, the switch Q1 is opened and one-shot 32 develops a pulse of duration T which inhibits the application of base drive to the transistor Q2. If the PWM wave returns to a high state before the end of the period T, the transistor Q2 is never turned on and hence the phase output $V_A$ "free wheels" due to the current flowing in the diodes D1 and D2. Also, when the PWM wave returns to a high state, the one-shot 44 does not produce a pulse since the output of the inhibit logic circuit 42 has not switched from a high state to a low state. This in turn prevents an inhibit drive signal from being applied to the drive logic 22. The transistor Q1 can therefore turn back on immediately when the PWM signal reassumes the high state, and hence the inverter voltage can rise back to its full value at top speed.

The instant invention is therefore useful in PWM inverters, if desired.

I claim:

1. A protection circuit for preventing simultaneous conduction of first and second switching devices having main current path electrodes connected in series across a voltage source, comprising:

means for developing complementary first and second drive signals; and first and second means coupled to the drive signal developing means but not coupled to a main current path electrode of either switching device for controlling the first and second switching devices, respectively, in response to the drive signals, each of the controlling means including an inhibit logic circuit having first and second inputs which receive the drive signal and an inhibit signal developed by the other controlling means, respectively, the inhibit logic circuit generating a control signal to turn on the respective switching device only when the drive signal is present and the inhibit signal from the other controlling means is not present and means for generating the inhibit signal which is coupled to the inhibit logic circuit of the other control means, such inhibit signal being generated during the time that the control signal is generated and for a predetermined time period thereafter.

2. The protection circuit of claim 1, wherein the inhibit signal generating means includes a one-shot for developing a pulse of a duration equal to the predetermined time period.

3. The protection circuit of claim 2, wherein the duration of the pulses developed by the one-shots in the controlling means is equal and greater than the anticipated turn-off times of the switching devices.

4. The protection circuit of claim 2, wherein the duration of the pulses generated by one of the one-shots is not equal to the duration of the pulses generated by the other one-shot.

5. The protection circuit of claim 1, wherein each inhibit signal generating means includes a one-shot coupled to the output of the inhibit logic circuit and an OR gate having first and second inputs coupled to the outputs of the other inhibit logic circuit and the one-shot, respectively.

6. The protection circuit of claim 5, wherein the one-shot develops a pulse of duration T when the output of the inhibit logic circuit drops to a low state.

7. The protection circuit of claim 1, wherein the inhibit logic circuit includes a NOR gate having an output and first and second inputs which receive an inverted version of the drive signal and the inhibit signal from the other controlling means, respectively.

8. A protection circuit for preventing simultaneous conduction of first and second switching devices having collector and emitter electrodes connected in series across a voltage source, comprising:

means for developing complementary first and second drive signals; and first and second drive logic circuits for controlling the first and second switching devices, respectively, each drive logic circuit being unconnected to the collector or emitter electrodes of the power switches and including an inhibit logic circuit having first and second inputs which receive the drive signal and an inhibit signal developed by the other drive logic circuit, respectively, the inhibit logic circuit generating a control signal to turn on the respective switching device only when the drive signal coupled thereto is in a high state and the inhibit signal is in a low state, means responsive to a falling edge of the control pulse for generating a pulse of fixed duration T and means coupled to the output of the inhibit logic circuit and the pulse generating means for developing the inhibit signal which is coupled to the inhibit logic circuit in the other drive logic circuit, such inhibit signal being in a high state and thereby preventing conduction of the other switching device until a duration T has passed since the control signal has fallen to a low state.

9. The protection circuit of claim 8, wherein the developing means is an OR gate.

10. The protection circuit of claim 8, wherein the inhibit logic circuit includes a NOR gate having an output and first and second inputs which receive an inverted version of the drive signal and the inhibit signal from the other drive logic circuit, respectively.

11. The protection circuit of claim 8, wherein the pulse generating means comprises a one-shot.

12. The protection circuit of claim 11, wherein the one-shots develop pulses of equal duration.

13. The protection circuit of claim 11, wherein the duration of the pulses generated by one of the one-shots is not equal to the duration of the pulses generated by the other one-shot.

14. A protection circuit for preventing simultaneous conduction of first and second switching devices having main current path electrodes connected in series across a voltage source, comprising:

means for developing complementary first and second drive signals; and first and second drive logic circuits for controlling the first and second switching devices, respectively, each drive logic circuit being unconnected to and therefore unresponsive to the current in or voltage of any of the main current path electrodes and including an inhibit logic circuit having first and second inputs which receive the drive signal and an inhibit signal developed by the other drive logic circuit, respectively, the inhibit logic circuit generating a control signal to turn on the respective switching device only when the drive signal coupled thereto is in a high state and the inhibit signal is in a low state, a one-shot responsive to a falling edge of the control pulse for generating a pulse of fixed duration T and an OR gate having inputs coupled to the output of the inhibit logic circuit and the one-shot for developing the inhibit signal which is coupled to the inhibit logic circuit in the other drive logic circuit, such inhibit signal being in a high state and thereby preventing conduction of the other switching device until the duration T has passed since the control signal has fallen to a low state.

15. The protection circuit of claim 14, wherein the inhibit logic circuit includes a NOR gate having an output and first and second inputs which receive an inverted version of the drive signal and the inhibit signal from the other drive logic circuit, respectively.

16. The protection circuit of claim 14, wherein the one-shots develop pulses of equal duration.

17. The protection circuit of claim 14, wherein the duration of the pulses generated by one of the one-shots is not equal to the duration of the pulses generated by the other one-shot.

* * * * *